United States Patent [19]
Renaud

[11] Patent Number: 6,021,491
[45] Date of Patent: *Feb. 1, 2000

[54] DIGITAL SIGNATURES FOR DATA STREAMS AND DATA ARCHIVES

[75] Inventor: Benjamin J. Renaud, Woodside, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/753,716

[22] Filed: Nov. 27, 1996

[51] Int. Cl.$^7$ .................................................. H04L 9/32
[52] U.S. Cl. ............................................. 713/179; 713/180
[58] Field of Search ............................................. 380/4, 25

[56] References Cited

U.S. PATENT DOCUMENTS

| | | | |
|---|---|---|---|
| 4,405,829 | 9/1983 | Rivest et al. | 178/22.1 |
| 4,981,370 | 1/1991 | Dziewit et al. | 380/25 |
| 5,005,200 | 4/1991 | Fischer | 380/30 |
| 5,031,214 | 7/1991 | Dziewit et al. | 380/23 |
| 5,163,091 | 11/1992 | Graziano et al. | 380/25 |
| 5,191,613 | 3/1993 | Graziano et al. | 380/25 |
| 5,457,746 | 10/1995 | Dolphin | 380/4 |
| 5,499,294 | 3/1996 | Friedman | 380/10 |
| 5,572,590 | 11/1996 | Chess | 380/4 |
| 5,572,673 | 11/1996 | Shurts | 395/186 |
| 5,619,571 | 4/1997 | Sandstrom et al. | 380/4 |
| 5,625,693 | 4/1997 | Rohatgi et al. | 380/23 |
| 5,673,316 | 9/1997 | Auerbach et al. | 380/4 |
| 5,677,953 | 10/1997 | Dolphin | 380/4 |
| 5,703,951 | 12/1997 | Dolphin | 380/25 |
| 5,757,915 | 5/1998 | Aucsmith et al. | 380/25 |

OTHER PUBLICATIONS

"Public–Key Digital Signature Algorithms", Applied Cryptography, 2nd Edition,, ISBN 0–471–11709–9.
Cryptolope Containers: A White Paper, downloaded from www.cryptolope.ibm.com/white.htm on Feb. 27, 1997.
Cryptolope Containers in the News, downloaded from www.cryptolope.ibm.com/press.htm on Feb. 27, 1997.
About Cryptolope Containers, downloaded from www.cryptolope.ibm.com/about.htm on Feb. 27, 1997.

*Primary Examiner*—Tod R. Swann
*Assistant Examiner*—Todd Jack
*Attorney, Agent, or Firm*—Beyer & Weaver, LLP

[57] ABSTRACT

Methods, apparatuses and products are provided for verifying the authenticity of data within one or more data files. Each data file is provided with an identifier, such as a one-way hash function or cyclic redundancy checksum. A signature file, that includes the identifiers for one or more data files, is provided with a digital signature created with a signature algorithm. The data file(s) and signature file are then transferred, or otherwise provided to a user. The user verifies the digital signature in the signature file using a signature verifying algorithm. Once verified as being authentic, the signature file can be used to verify each of the data files. Verification of the data files can be accomplished by comparing the identifier for each data file with the corresponding identifier in the signature file. If the identifiers in the data and signature files match, then the data file can be marked as authentic. If the identifiers do not match then the data file can be rejected or otherwise dealt with accordingly.

13 Claims, 3 Drawing Sheets

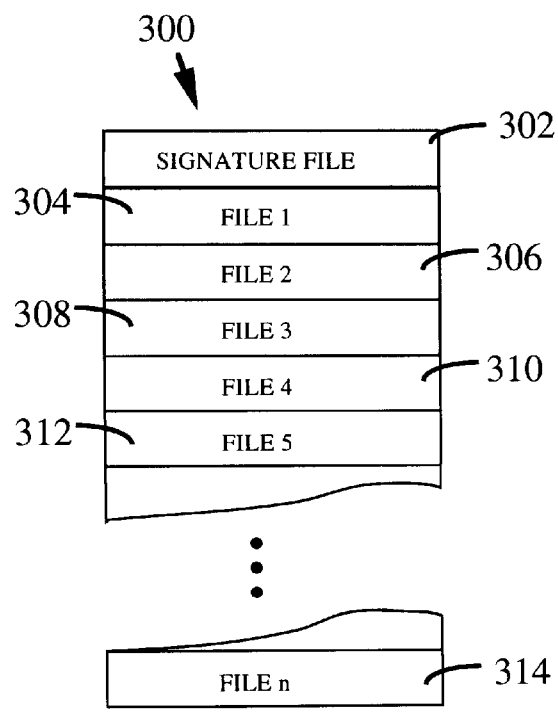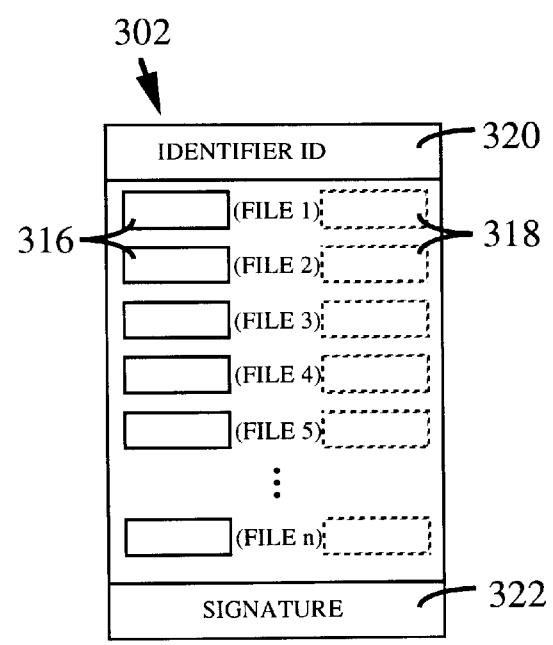
FIGURE 3a
FIGURE 3b

DIGITAL SIGNATURES FOR DATA STREAMS AND DATA ARCHIVES

FIELD OF THE INVENTION

The present invention relates generally to the sharing of data among computing resources. More specifically, the present invention relates to methods, apparatuses and products for securing and verifying the authenticity of data being processed on a computer system.

BACKGROUND OF THE INVENTION

With the increasing popularity of networked computing environments, such as the Internet, there has been a corresponding increase in the demand for secure transactions between networked computers. For example, when a user of the Internet sends information to another user, it may be useful for the recipient to verify that the data received has not been corrupted or otherwise altered during transmission. Furthermore, the recipient may also find it useful to be able to verify the identity of the sender in order to verify that the data received was actually sent by the proper sender, as opposed to an impostor. As a result, methods and algorithms that increase the security of data transmitted over computer networks and other data links have been developed and deployed with some success. The more secure methods tend to include encrypting all or part of the data prior to sending it, and likewise decrypting the received data prior to using it. Such encryption and decryption techniques may, for example, include adding encryption data to the data file, and encoding or otherwise transforming the data in the data file with a computer system by running a "signature algorithm".

There are currently several signature algorithms in use. One popular signature algorithm is actually a combination of a Message Digest algorithm and an RSA encryption algorithm (e.g., MD5 with RSA, or MD2 with RSA, or the like). U.S. Pat. No. 4,405,829, issued Sep. 20, 1983 describes the combination of a Message Digest with the RSA that is available from RSA Data Security, Inc. of Redwood City, Calif. Another popular signature algorithm is the DSA encryption algorithm. The DSA encryption algorithm, which is available from the United States Government, may be used for limited purposes by private parties as a signature algorithm. These signature algorithms will be discussed in limited detail below. For a more detailed description of these and other signature algorithms and related encryption operations, refer to *Applied Cryptography*, Second Edition, 1996, by Bruce Schneier which is available from John Wiley & Sons, Inc. of New York City, N.Y., and which is herein incorporated, in its entirety, by reference.

The Message Digest with RSA algorithm includes the capability to generate a "digital signature" that can be added to data files. Digital signatures are basically mechanisms through which users may authenticate the source of a received data file. A digital signature is typically a special sequence of data that can be generated and provided along with a related data file to other users. The basic concept behind most signature algorithms is that every user (e.g., individuals, companies, governments, etc.) will have a "key pair" that includes both a "private key" and a "public key". A key may, for example, be a numerical sequence. The private key is a unique key that is assigned to a single user and intended to be kept secret by that user. The private key may be used by the assigned user to create a digital signature for a data file with a signature algorithm. The public key, on the other hand, is typically made available to all other users. The public key may be used by these other users to verify that the digital signature on a received data file is authentic (i.e., that the digital signature was created with the private key). The verification process is accomplished with the same signature algorithm. In principle, such a verification process may provide a relatively high level of confidence in the authenticity of the source of the received data.

In addition to digital signature generating algorithms, there are also algorithms that may be used to authenticate that the data file has not been corrupted in some manner. These algorithms are typically known as "one-way hash functions." One example of such an algorithm is the Message Digest, discussed above. A one-way hash function usually does not require a key. Rather, one-way hash functions typically include additional data that is inserted into the data file. As such, when the data file is received, the hash function may be used to verify that none of the data within the data file has been altered since the generation of the hash function. However, hash functions are typically limited in that the user can not infer anything about the origin of the associated file, such as who sent it. It is noted that many signature algorithms use one-way hash functions as internal building blocks.

For relatively open, unsecured networks such as the Internet, it is often useful for users to be able to authenticate received data files prior to using them. Such data files may include, but are not limited to, computer programs, graphics, text, photographs, audio, video, or other information that is suitable for use within a computer system. Regardless of the type of data file, authentication may be accomplished with a signature algorithm or similar type of encryption algorithm as described above. By way of example, if the data file is a software program, the user may wish to authenticate that it was sent by a trustworthy authority prior to exposing his or her computer system to the software program, to insure that the program does not include a "Trojan Horse" that infects the user's computer with a virus. In such a case, the sending user may authenticate the data as described above.

Another example is where the receiving user wishes to authenticate a text and/or image data file prior to displaying it on his or her computer screen. This may be useful to control the display of text and images having undesirable content. For example, parents may want to limit any access their children may have to pictures and text relating to adult subjects and materials. This can be accomplished by verifying that the data file (e.g., a text or image file), came from a trusted source. Similarly, providers of text and image files may want to provide a "stamp" of approval or authenticity so as to control the use of tradenames and other intellectual property.

Unfortunately, the process of encrypting and decrypting, signing and verifying, and/or generating hash functions places an additional burden on the sending and receiving user's computational resources. The burden is compounded for users who send and receive several data files. By way of example, the growth of the portion of the Internet known as the World-Wide Web has lead to a tremendous increase in the transfer of multiple data files between users. These multiple data files often include the components or objects that constitute an object-oriented software process, such as a Java™ applet. To illustrate the potential burden that can be placed on the receiving user's computer resources in such a multiple data file transfer, one need only calculate the resulting processing time associated with verifying the digital signatures for each of the files. Consider an example wherein a Java™ applet includes 200 digitally signed Java™ class files (including data files), and the average verification period is about 1 second on a conventional desktop PC. In such a situation, the user would have to wait for about 200 seconds after receiving the data files to use the applet. Such delays may significantly reduce the effectiveness of such a computer network environment. This is especially true for data files relating to a timed process, such as streaming audio or video data file in real (or near-real) time.

Therefore, what is desired are more efficient methods, apparatuses and products for securing and verifying the authenticity of data files, especially for data files intended to be transferred over computer networks.

SUMMARY OF THE INVENTION

The present invention provides more efficient methods, apparatuses and products for securing and verifying the authenticity of data files, such as data files intended to be transferred over computer networks. In accordance with one aspect of the present invention, "hybrid" verification techniques are provided that streamline the signature and verification processes such that several data files can be quickly signed for and transferred, and quickly received, authenticated and processed.

In accordance with one embodiment of the present invention, a method for creating a secure data file is provided. The secure data file is suitable for transferring data over a computer network, or between two or more computers. The method includes providing at least one data file that has an identifier. The identifier can, for example, be generated with a one-way hash function algorithm, or a cyclic redundancy checksum algorithm running on a computer. The data file also includes a digital bit stream that encodes information such as a text file, an image file, an audio file, a video file, a movie file, and a computer program file. The method further includes creating a signature file that contains a copy of the identifiers for each of the data files sought to be transferred. The signature file also includes a digital signature. The digital signature can, for example, be generated with using a computer having a signature algorithm, such as a DSA algorithm or a combined Message Digest and RSA algorithm. The signature file can also include additional data, such as, the name of the file, the file's author, the version of the file, a time-stamp, or a rating label.

In accordance with another embodiment of the present invention, an apparatus for creating a secure data file is provided. The apparatus includes an identifier generator that generates an identifier for one or more data files. The apparatus includes a signature file generator that generates a signature file that contains a copy of the identifiers associated with each of the data files and a digital signature.

In accordance with another embodiment of the present invention, a computer program product is provided. The computer program product includes a computer-usable medium that contains computer-readable program code embodied thereon. The computer-readable program code can be used with a computer system to create a secure data file by generating an identifier for one or more data files, and a signature file having a copy of each identifier and a digital signature.

In accordance with yet another embodiment of the present invention, a method for verifying the authenticity of at least one data file and a signature file is provided. The method includes verifying a digital signature that is in a signature file by using a computer. For example, the computer can use a signature algorithm, such as a DSA algorithm or a combined Message Digest and RSA algorithm, to verify the digital signature. Also within the signature file, there is provided one or more identifiers that are associated with one or more data files. The identifiers can, for example, be created with a one-way hash function algorithm or a cyclic redundancy checksum algorithm. The method further includes comparing each of the identifiers in the signature file with the identifier in each of the data files. The method can include marking the data file as signed when the identifiers in the data and signature files match. Additionally, the method can include ignoring the data file, aborting the loading of the data file, or alerting the user when the identifiers in the data and signature files do not match.

In accordance with another embodiment of the present invention, an apparatus is provided that verifies the authenticity of at least one data file and a signature file. The apparatus includes a verifier that verifies the digital signature, and a comparator that compares an identifier in the data file with a copy of the identifier that is in the signature file.

In accordance with another embodiment of the present invention, a computer program product is provided. The computer program product includes a computer-usable medium that contains computer-readable program code embodied thereon. The computer-readable program code can be used with a computer system to verify the authenticity of at least one data file and a signature file. The computer-readable program code providing for the verification of a digital signature in a signature file, and the comparison of an identifier in one or more data files with a copy of the identifier in the signature file.

In accordance with still another embodiment of the present invention, a secure data file in the form of a computer-readable medium is provided. The secure data file can be used in transferring one or more data files between a plurality of computers. The secure data file includes at least one data file that has an identifier, and a signature file that has a copy of the identifier for the data file and a digital signature.

BRIEF DESCRIPTION OF THE DRAWINGS

The invention, together with further advantages thereof, may best be understood by reference to the following description taken in conjunction with the accompanying drawings in which:

FIG. 3a illustrates an embodiment of an archival data structure, including a signature file, for use with an embodiment of the present invention;

FIG. 3b illustrates an embodiment of a signature file, for use with an embodiment of the present invention.

DETAILED DESCRIPTION OF THE INVENTION

In accordance with the embodiments of the present invention novel methods, apparatuses and products are provided that reduce the computational demands placed on both source user computer systems and receiving user computer systems by requiring only a single digital signature for an arbitrary number of data files. With an embodiment of the present invention the data files need not be individually signed. Instead, a separate signature file is created such that when it is digitally signed and later verified, the data files to which it corresponds can be authenticated without running the signature algorithm for each of these data files. In one embodiment, the signature file includes a list of "identifiers," such as one-way hash functions, that are each associated with a particular one of the data files to be transferred. As such, the signature file is essentially the cryptographic equivalent of a digital signature for each of the data files.

Thus, with an embodiment of the present invention a user can create a single signature file that includes unique identifiers for each of a plurality of data files. The signature file is digitally signed through the use of a signature algorithm. The signed signature file and the associated data files may then be sent to a receiving user, who verifies the digital signature using the appropriate signature algorithm. Once the digital signature has been verified, the identifiers within the signature file are compared to the identifiers within the data files. If the identifier within a given data file matches the corresponding identifier in the signature file, then the data file is verified as being authentic. The receiving user can then proceed to process the verified data files with confidence in their authenticity. As a result, computational delays can be significantly reduced because there is no longer the need to digitally sign and later verify the digital signature for each of the data files.

Figure 1:
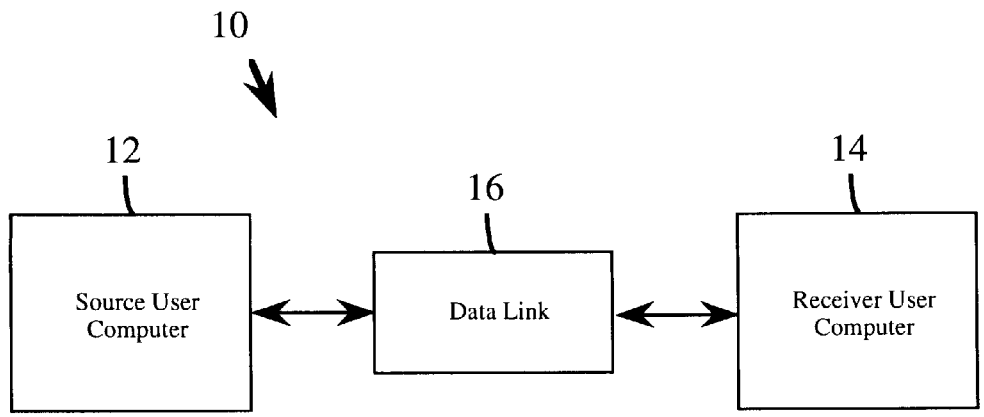
FIG. 1 illustrates a networked computing environment.

FIG. 1 illustrates a networked computing environment 10, as represented by a block diagram of a source user computer system 12 coupled to exchange information in the form of data with a receiver user computer system 14 over a data link 16. Source user computer system 12 can, for example, take the form of a server computer such as a web server associated with the Internet. Likewise, receiving user computer system 14 can, for example, take the form of a client system that is networked via data link 16 to a web server. In such a case, data link 16 can therefore represent a portion of, or the entire, Internet and other connected networks. Data link 16 can also represent one or more local area networks (LANs), wide area networks (WANs), "intranets" or "extranets", or other like telecommunication or data networks.

Figure 2:
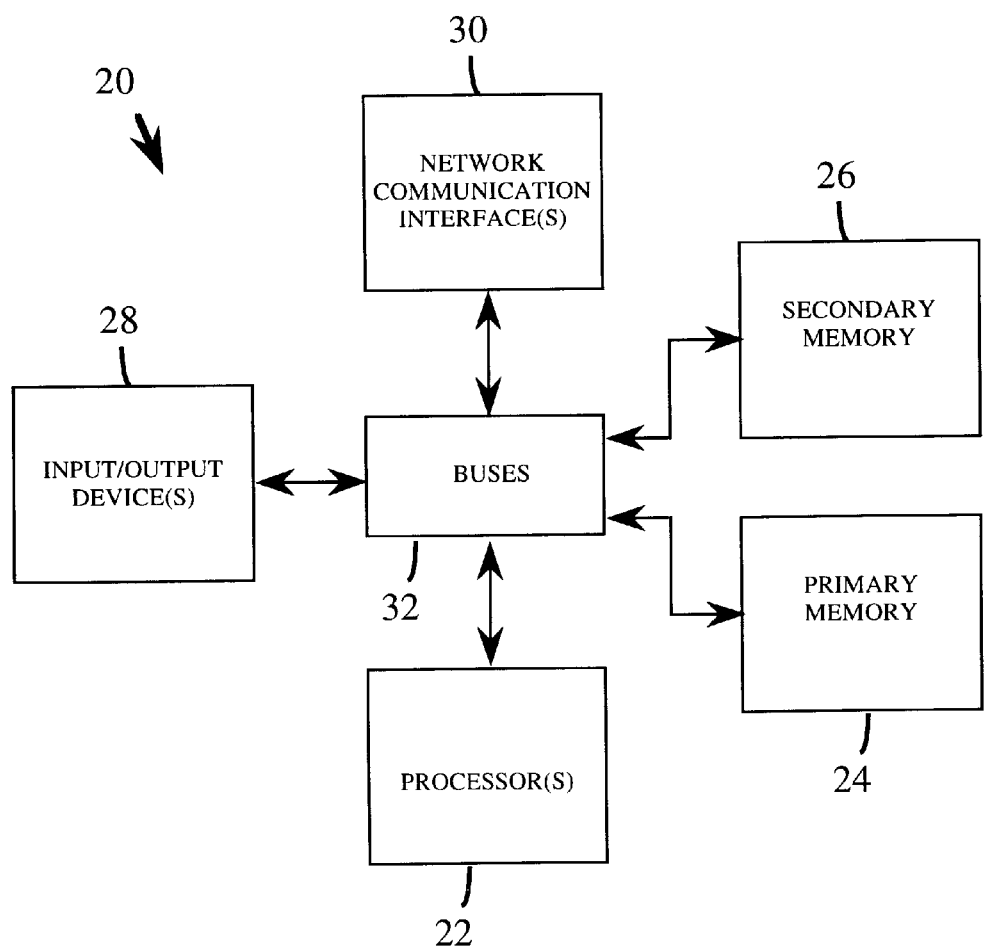
FIG. 2 illustrates a typical computer system for use with the networked computing environment in FIG. 1.

FIG. 2 illustrates a typical computer system 20 that can be used by either a sending user or a receiving user, in accordance with FIG. 1. Alternatively, computer system 20 can be a stand-alone computer capable of receiving data through computer useable products. Computer system 20 includes one or more processors 22, a primary memory 24, a secondary memory 26, one or more input/output (I/O) devices 28, one or more network communication devices 30, and one or more buses 32.

Processors 22 provide the capability to execute computer instructions. Processors 22 can, for example, be microprocessors, central processing units (CPUs), or microcontrollers such as found in many of the desktop, laptop, workstation, and mainframe computers available on the market. Processors 22 can also take the form of conventional or even customized or semi-customized processors such as those typically used in special purpose or larger frame computers, telecommunication switching nodes, or other networked computing devices. Processors 22 are coupled to output data to buses 32 and to input data from buses 32.

Buses 32 are capable of transmitting or otherwise moving data between two or more nodes. Buses 32 can, for example, take the form of a shared general purpose bus or can be dedicated to transmitting specific types of data between specific nodes. Buses 32 can include interface circuitry and software for use in establishing a path between nodes over which data can be transmitted. It is recognized that some devices, such as processors 22 can also include one or more buses 32 internally for transmitting data between internal nodes therein. Data can include processed data, addresses, and control signals.

Primary memory 24 typically provides for the storage and retrieval of data. Primary memory 24 can, for example, be a random access memory (RAM) or like circuit. Primary memory 24 can be accessed by other devices or circuits, such as processors 22, via buses 32.

Secondary memory 26 typically provides for additional storage and retrieval of data. Secondary memory 26 can, for example, take the form of a magnetic disk drive, a magnetic tape drive, an optically readable device such as a CD ROMs, a semiconductor memory such as PCMCIA card, or like device. Secondary memory 26 can be accessed by other devices or circuits, such as processors 22, via buses 32. Secondary memory 26 can, for example, access or read data from a computer program product including a computer-usable medium having computer-readable program code embodied thereon.

I/O devices 28 typically provide an interface to a user through which data can be shared. I/O devices 28 can, for example, take the form of a keyboard, a tablet and stylus, a voice or handwriting recognizer, or some other well-known input device such as, of course, another computer. I/O devices 28 can also, for example, take the form of a display monitor, flat panel display, or a printer. I/O devices 28 can be accessed by other devices or circuits, such as processors 22, via buses 32.

Network communication devices 30 typically provide an interface to other computing resources and devices, such as other computer systems. Network communication devices 30 typically include interface hardware and software for implementing data communication standards and protocols over data communication links and networks. For example, with a network connection, processors 22 can send and receive data (i.e., information) over a network. The above-described devices and processes will be familiar to those of skill in the computer hardware and software arts.

FIG. 3a illustrates an embodiment of an archival data structure 300 in accordance with an embodiment of the present invention. Data structure 300 includes a signature file 302 and several associated data files 304–314. Files 304–314 can be any digital bit stream, such as, for example, Java™ class files, image files, audio files, text files, and even additional signature files.

FIG. 3b illustrates an embodiment of a signature file 302. In the illustrated embodiment, signature file 302 includes at least one identifier 316 for each of the data files 304–314. Optionally, signature file 302 can also contain additional data 318 for each of the data files 304–314. For example, additional data 318 may take the form of the name of the file, the author of the file, the date of the file, the version of the file, the file's rating (e.g., movie rating, such as "PG"), or any other authenticated data that the users may want to include within signature file 302.

Signature file 302 further includes an identifier ID 320 and a digital signature 322. Identifier ID 320 provides the information necessary to determine the algorithm(s) used to create the identifiers listed in signature file 302. Digital signature 322 represents the digital signature created for the signature file. The structure of digital signature 322 will depend, of course, on the signature algorithm used to create it.

Figure 4:
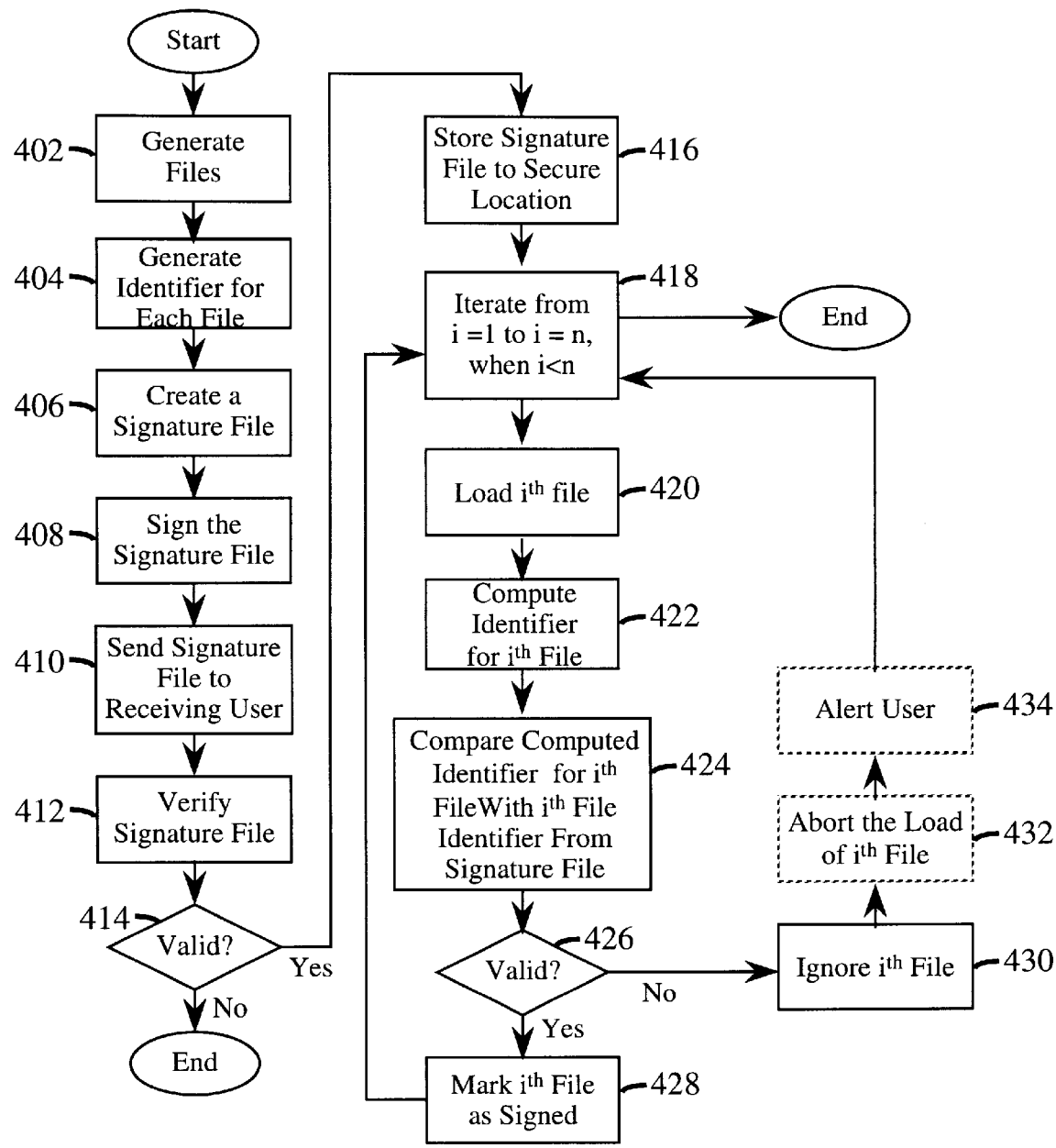
FIG. 4 is a flow chart of an embodiment of the present invention for use with data structures having signature files.

FIG. 4 illustrates a method 400, in accordance with an embodiment of the present invention, that includes step 402 for generating one or more data files. Step 402 can, for example, include using a text program to generate a text file, a recording program to generate an audio or video file, a graphics program to generate an image or movie file, a programming language to generate a class file or program file, or any other mechanism that is capable of generating a data file.

Having generated one or more data files in step 402, step 404 includes generating an identifier for each of these data files. The identifiers generated in step 404 can, for example, be generated by a one-way hash function algorithm, or alternatively can even take the form of a cyclic redundancy checksum (CRC), or the like. It is recognized, however, that generally a one-way hash function algorithm tends to provide for greater security because such functions cannot be easily or efficiently broken or otherwise reverse-engineered. By way of example, one-way hash function algorithms, such as MD5 and SHA are typically considered to be cryptographically secure. Such algorithms will be known to those having skill in the computer science art.

Next, step 406 includes creating a signature file that lists, or otherwise compiles, the identifiers as generated in step 404. A signature file can, for example, be a text file that lists the identifiers. Optionally, a signature file can further include, for example, the name of each file, the author of each file, the file version, a date-stamp for the file, or other data relating to each data file. Step 406 can further include one or more programs that inquire, trace, select, or otherwise gather or render such data from the data files. Step 406 can be performed, for example, by processing the data files in a batch mode process to gather the appropriate identifiers and any additional data. Those skilled in the art will recognize that there can be benefits (e.g., in efficiency) to specifically ordering, grouping or otherwise arranging the data listed in the signature file in some manner that expedites the steps in method 400. For example, it can be useful to group the file name or the author along with the identifier.

Once the signature file has been created, step 408 includes digitally signing the signature file with a signature algorithm. Examples of suitable signature algorithms include a combined Message Digest algorithm and RSA encryption algorithm (e.g., MD5 with RSA, or MD2 with RSA, or the like), or the DSA algorithm (discussed above). Step 408 can also include, for example, generating a digital signature for the signature file with a signature algorithm by way of a public or private key (e.g., see Schneier, above).

The signed signature file from step 408 is then sent, provided or otherwise made available to the receiving user in step 410. Step 410 can, for example, include transmitting the signed signature file over a data bus, data link, the Internet, or some other computer or data communication network or link. In addition it is recognized that step 410 can, for example, include storing the signature file in a computer readable medium like a magnetic storage media or optical storage media, and moving the signed signature file on the computer readable medium from one computer to another computer.

Upon receipt or access, the receiving user in step 412, verifies the authenticity of the signed signature file sent or made available in step 410. Step 412 can, for example, include verifying the digital signature on the signed signature file with a signature algorithm by way of a key.

Step 414 represents a decision wherein the validity of the digital signature as determined in step 412 either terminates or continues method 400. While depicted as interrupting or otherwise preempting method 400, it is recognized that step 414 can also include invoking another process, such as an alarm or notification process, or log process, that in some way records or identifies, or otherwise addresses that that verification of the signed signature file in step 412 failed.

If the decision in step 414 is that the file is valid (i.e., authentic), then the process continues to step 416 which includes storing at least the identifiers from the signature file. In one embodiment of the present invention, the identifiers are stored in a secure location. A secure location can, for example, be the RAM of the receiving computer system since this memory is readily cleared when the process is completed. Alternatively, the identifiers can be stored to a disk or tape drive wherein they can be retrieved at some later stage. Those skilled in the art will recognize that various data storage devices and other computer system configurations pose varying and potential security risks (i.e., some storage devices will be more secure than others). It is also recognized that additional security measures, such as encryption and file access privileges, can be used to further secure or increase the trustworthiness of the signature file as stored in step 414.

Once the identifiers have been stored in a secure location in step 416, then the data file or data files whose identifiers were listed in the signature file in step 406 can then be processed in accord with a loop as represented in step 418. Step 418 can, for example, include a counter mechanism that iteratively controls the number of times that step 420 will be entered into based on the number of identifiers listed in the signature file. For example, if there are "n" number identifiers listed in the signature file (i.e., there are n data files to be loaded), then an iterative loop can count up from i=1 to i=n, or alternatively down from i=n to i=1, or otherwise determines when all of the data files have been loaded, or that loading has been attempted, in accord with the remainder of the steps in method 400 as presented below.

Step 420 includes loading the $i^{th}$ data file. Step 420 can, for example, include any of the methods in step 410 to either download, upload, broadcast, or otherwise move the $i^{th}$ data file from one location to another location. Once the $i^{th}$ data file has been loaded, step 422 includes providing, computing or generating the identifier for the $i^{th}$ data file with the appropriate identifier algorithm (for that data file).

Next, step 424 includes comparing the identifier provided in step 422 with the identifier listed, for the $i^{th}$ data file, in the signature file which was stored in step 416. If the identifiers match then the $i^{th}$ data file is verified as authentic. If the identifiers do not match then the $i^{th}$ data file is considered not to have been verified.

Step 426 represents a decision wherein the validity of the identifier, as determined in step 424, either interrupts or continues the iterative loop of step 418. If the identifier for the $i^{th}$ data file has been verified in step 424, then step 426 continues the iterative loop of step 418 by proceeding to step 428 which includes marking, or otherwise recording or establishing in some manner, that the $i^{th}$ data file has been verified as being authentic. Step 428 can, for example, include modifying or marking the $i^{th}$ data file as having been signed by the source user.

If, on the other hand, the identifier for the $i^{th}$ data file is not verified as authentic in step 424, then step 426 interrupts the iterative loop of step 418 by proceeding to step 430. Step 430 includes interrupting the iterative loop of step 418 in some manner so as to avoid step 428 and to proceed back to step 418. Step 430 can, for example, include ignoring the $i^{th}$ data file. In addition to step 430, other steps can be included in method 400 to somehow record or otherwise identify that the $i^{th}$ data file is not authentic.

Thus, with the data structure and steps above, a user who is sending several data files will likely reduce the associated processing time because rather than having to generate a separate digital signature for each data file, the sending user need only create a signature file and digitally sign that file. Likewise, with the data structure and steps above, the user who is receiving several data files will likely reduce the associated processing time because rather having to verify each data file as being authentic by decrypting an associated digital signature, the receiving user need only verify that the signature file is authentic. Such as hybrid verification process substantially streamlines the signature and verification processes. As a result, data files may be digitally signed, and later authenticated and processed in less time.

Additionally, step 430 can lead to optional step 432 which aborts the attempted load, and/or to optional step 434 which alerts or otherwise warns of the failure to verify authentication in step 424. Once steps 430, and optionally 432 and/or 434, have been completed then method 400 returns to step 418 to complete the iterative loop therein. Once the iterative loop of step 418 has been completed, then method 400 is ended.

The embodiment of the present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as generating, calculating, computing, marking, ignoring, aborting, alerting, verifying, signing, sending, receiving, creating, iterating, identifying, running, or comparing. In any of the operations described herein that form part of an embodiment of the present invention these operations are machine operations. Useful machines for performing the operations of an embodiment of the present invention include general purpose digital computers or other similar devices. In all cases, there should be borne in mind the distinction between the method of operations in operating a computer and the method of computation itself. An embodiment of the present invention relates to method steps for operating a computer in processing electrical or other physical signals to generate other desired physical signals.

An embodiment of the present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, an embodiment of the present invention further relates to computer readable media that include program instructions for performing various computer-implemented operations. The media and program instructions may be those specially designed and constructed for the purposes of an embodiment of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially arranged to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the identifiers or signature algorithms may be further selected, modified or otherwise limited in use so as to adhere to export regulations. This is especially true for computers networked to provide for the global exchange of data files. Therefore, the described embodiments should be taken as illustrative and not restrictive, and the invention should not be limited to the details given herein but should be defined by the following claims and their full scope of equivalents.

What is claimed is:

1. A method for creating a secure data file suitable for transferring over a computer network, the method comprising:

providing at least one data file having an identifier using a computer system; and creating a signature file having the identifier for the at least one data file and a digital signature using the computer system, the signature file being separate from the at least one data file, wherein the signature file is arranged to substantially vouch for the authenticity of the at least one data file.

2. A method as recited in claim 1 further including:

running a signature algorithm on the signature file; and determining when running the signature algorithm on the signature file verifies the authenticity of the signature file, wherein when it is determined that the signature file is authentic, the at least one data file is determined to be authentic.

3. A method as recited in claim 1 further including:

providing a second data file having an identifier using the computer system;

adding the identifier for the second data file to the signature file, wherein the signature file is arranged to vouch for the authenticity of the at least one data file and the second data file;

running a signature algorithm on the signature file; and determining when running the signature algorithm on the signature file verifies the authenticity of the signature file, wherein when it is determined that the signature file is authentic, the at least one data file and the second data file are determined to be authentic.

4. A method as recited in claim 3 further including:

comparing the identifier for the at least one data file with the identifier for the at least one data file in the signature file when it is determined that the signature file is authentic, wherein when the identifier for the at least one data file and the identifier for the at least one data file in the signature file match, the at least one data file is determined to be authentic; and comparing the identifier for the second data file with the identifier for the second data file in the signature file when it is determined that the signature file is authentic, wherein when the identifier for the second data file and the identifier for the at second data file in the signature file match, the second data file is determined to be authentic.

5. A method as recited in claim 2 wherein when it is determined that the signature file is authentic, substantially only the at least one data file is transferred over the network.

6. A method as recited in claim 5 wherein when it is determined that the signature file is authentic, the signature file and the at least one data file are separately transferred over the network.

7. A method for verifying the authenticity of a first digital data file and a digital signature file, the digital signature file being separate from the first digital data file, the first digital data file including an identifier, the digital signature file including the identifier for the first data file and a digital signature, the method including:

verifying the digital signature using a computer system to determine the authenticity of the digital signature file;

determining when the digital signature is verified; and comparing the identifier in the first digital data file with the identifier for the first digital data file in the digital signature file using the computer system to identify the first digital data file as authentic when it is determined that the digital signature is verified.

8. A method as recited in claim 7 further including a second digital file having an identifier, the second digital file being separate from the first digital file and the digital signature file, the digital signature file including the identifier for the second digital file.

9. A method as recited in claim 8 further including:

comparing the identifier in the second digital data file with the identifier for the second digital data file in the digital signature file using the computer system to identify the second digital file as authentic when it is determined that the digital signature is verified.

10. A method for verifying the authenticity of a plurality of data files suitable for transfer over a networked computing system, each of the plurality of data files including a data file identifier, the method comprising:

creating a single signature file, the signature file including a digital signature, the signature file further including a version of the data file identifier for each of the plurality of data files, the single signature file being separate from each of the plurality of data files; and verifying the authenticity of the digital signature included in the signature file, wherein when the digital signature included in the signature file is verified as being authentic, each of the plurality of data files is considered to be authentic.

11. A method as recited in claim 10 further including:

transferring the plurality of data files over the networked computing system when the digital signature included in the signature file is verified as being authentic.

12. A method as recited in claim 10 wherein verifying the authenticity of the digital signature included in the signature file includes running a signature algorithm on the digital signature, and wherein each of the plurality of data files is considered to be authentic when the authenticity of the digital signature is verified without running a verification algorithm on each of the plurality of data files.

13. A method as recited in claim 10 further including:

comparing the version of the data file identifier for each of the plurality of data files with the corresponding data file identifier for each of the plurality of data files when the digital signature included in the signature file is verified as being authentic, wherein when the version of the data file identifier for a particular data file selected from the plurality of data files substantially matches the data file identifier for the particular data file selected from the plurality of data files, the particular data file selected from the plurality of data files is considered to be authentic.

* * * * *